US010242666B2

(12) United States Patent
Monceaux et al.

(10) Patent No.: US 10,242,666 B2
(45) Date of Patent: Mar. 26, 2019

(54) METHOD OF PERFORMING MULTI-MODAL DIALOGUE BETWEEN A HUMANOID ROBOT AND USER, COMPUTER PROGRAM PRODUCT AND HUMANOID ROBOT FOR IMPLEMENTING SAID METHOD

(71) Applicant: SOFTBANK ROBOTICS EUROPE, Paris (FR)

(72) Inventors: Jérôme Monceaux, Paris (FR); Gwennaël Gate, Paris (FR); David Houssin, Paris (FR); Gabriele Barbieri, Paris (FR); Jocelyn Martin, Montrouge (FR); Jean Testard, Paris (FR); Ilmo Gourdin, Saint-Cyr l'Ecole (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 105 days.

(21) Appl. No.: 15/300,226

(22) PCT Filed: Apr. 17, 2015

(86) PCT No.: PCT/EP2015/058373
§ 371 (c)(1),
(2) Date: Sep. 28, 2016

(87) PCT Pub. No.: WO2015/158887
PCT Pub. Date: Oct. 22, 2015

(65) Prior Publication Data
US 2017/0148434 A1 May 25, 2017

(30) Foreign Application Priority Data

Apr. 17, 2014 (EP) ..................................... 14305583

(51) Int. Cl.
*G05D 1/00* (2006.01)
*G10L 15/18* (2013.01)
(Continued)

(52) U.S. Cl.
CPC .......... *G10L 15/1815* (2013.01); *B25J 9/1694* (2013.01); *B25J 11/005* (2013.01);
(Continued)

(58) Field of Classification Search
USPC ................................................. 700/245–264
See application file for complete search history.

(56) References Cited

U.S. PATENT DOCUMENTS 4,398,720 A * 8/1983 Jones .................. A63F 3/00643
273/238
4,729,563 A * 3/1988 Yokoi ..................... A63F 13/04
446/175
(Continued)

FOREIGN PATENT DOCUMENTS

JP 2006-187825 A 7/2006
WO 2011/003628 A2 1/2011
(Continued)

OTHER PUBLICATIONS

F. Alonso-Martin et al., "A Multimodal Emotion Detection System during Human-Robot Interaction," Sensors, vol. 13, 2013, pp. 15549-15581.
(Continued)

Primary Examiner — Jonathan L Sample
(74) Attorney, Agent, or Firm — Baker & Hostetler LLP

(57) ABSTRACT

A method of performing dialog between a humanoid robot and user comprises: i) acquiring input signals from respective sensors, at least one being a sound sensor and another being a motion or image sensor; ii) interpreting the signals to recognize events generated by the user, including: the
(Continued)

utterance of a word or sentence, an intonation of voice, a gesture, a body posture, a facial expression; iii) determining a response of the humanoid robot, comprising an event such as: the utterance of a word or sentence, an intonation of voice, a gesture, a body posture, a facial expression; iv) generating, an event by the humanoid robot; wherein step iii) comprises determining the response from events jointly generated by the user and recognized at step ii), of which at least one is not words uttered by the user. A computer program product and humanoid robot for carrying out the method is provided.

25 Claims, 6 Drawing Sheets

(51) Int. Cl.
  *B25J 9/16* (2006.01)
  *B25J 11/00* (2006.01)
  *B25J 13/00* (2006.01)
  *G06N 3/00* (2006.01)
  *G10L 15/22* (2006.01)
  *G10L 15/32* (2013.01)
  *G06F 17/27* (2006.01)
  *G10L 15/02* (2006.01)

(52) U.S. Cl.
  CPC ......... *B25J 11/0015* (2013.01); *B25J 13/003* (2013.01); *G06N 3/008* (2013.01); *G10L 15/22* (2013.01); *G06F 17/271* (2013.01); *G10L 15/18* (2013.01); *G10L 15/32* (2013.01); *G10L 2015/025* (2013.01)

(56) References Cited

U.S. PATENT DOCUMENTS

| | | | | |
|---|---|---|---|---|
| 4,815,733 A * | 3/1989 | Yokoi | A63F 13/04 | 446/175 |
| 6,452,348 B1 * | 9/2002 | Toyoda | B25J 13/003 | 318/3 |
| 6,519,506 B2 * | 2/2003 | Osawa | A63H 3/28 | 318/565 |
| 6,560,512 B1 * | 5/2003 | Rosen | B25J 9/1664 | 700/245 |
| 6,580,369 B1 * | 6/2003 | Eberhardt | G06K 7/0008 | 257/E21.503 |
| 6,615,109 B1 * | 9/2003 | Matsuoka | G06K 17/00 | 700/223 |
| 6,714,840 B2 * | 3/2004 | Sakaue | B25J 9/1694 | 318/568.1 |
| 6,832,132 B2 * | 12/2004 | Ishida | B62D 57/032 | 180/8.1 |
| 6,895,305 B2 * | 5/2005 | Lathan | A63F 13/00 | 700/245 |
| 6,967,455 B2 * | 11/2005 | Nakadai | B25J 13/00 | 318/567 |
| 6,980,956 B1 * | 12/2005 | Takagi | G06N 3/004 | 700/250 |
| 7,065,490 B1 * | 6/2006 | Asano | G10L 13/033 | 318/568.12 |
| 7,136,722 B2 * | 11/2006 | Nakamura | B25J 9/1633 | 700/245 |
| 7,164,969 B2 * | 1/2007 | Wang | B25J 5/007 | 700/245 |
| 7,313,524 B1 * | 12/2007 | Minamino | | 704/270 |
| 8,484,146 B2 * | 7/2013 | Movellan | B25J 13/003 | 700/245 |
| 8,594,845 B1 * | 11/2013 | Gharpure | G10L 15/22 | 700/253 |
| 8,676,581 B2 * | 3/2014 | Flaks | G10L 17/00 | 348/143 |
| 8,812,171 B2 * | 8/2014 | Filev | B60W 50/10 | 701/1 |
| 8,918,208 B1 * | 12/2014 | Hickman | B25J 9/1697 | 700/253 |
| 8,942,849 B2 * | 1/2015 | Maisonnier | B25J 11/0005 | 700/250 |
| 9,302,393 B1 * | 4/2016 | Rosen | B25J 9/1694 | |
| 9,950,421 B2 * | 4/2018 | Monceaux | A63F 9/183 | |
| 2002/0061504 A1 * | 5/2002 | Saijo | B25J 13/00 | 434/268 |
| 2002/0081937 A1 * | 6/2002 | Yamada | A63H 3/48 | 446/175 |
| 2002/0120362 A1 * | 8/2002 | Lathan | A63F 13/00 | 700/245 |
| 2003/0045203 A1 * | 3/2003 | Sabe | G06N 3/008 | 446/356 |
| 2003/0220796 A1 * | 11/2003 | Aoyama | G10L 15/22 | 704/275 |
| 2004/0006483 A1 * | 1/2004 | Sasaki | G10L 15/22 | 704/277 |
| 2004/0039483 A1 * | 2/2004 | Kemp | B65D 57/02 | 700/245 |
| 2004/0104702 A1 * | 6/2004 | Nakadai | B25J 13/00 | 318/568.12 |
| 2004/0190754 A1 * | 9/2004 | Sakagami | H04N 7/18 | 382/103 |
| 2005/0038647 A1 * | 2/2005 | Baker | G10L 15/065 | 704/231 |
| 2005/0197739 A1 * | 9/2005 | Noda | B25J 11/001 | 700/245 |
| 2005/0216121 A1 * | 9/2005 | Sawada | G06N 3/008 | 700/245 |
| 2005/0240412 A1 * | 10/2005 | Fujita | G10L 15/16 | 704/270 |
| 2006/0122837 A1 * | 6/2006 | Kim | G10L 15/22 | 704/270.1 |
| 2006/0136210 A1 * | 6/2006 | Menendez-Pidal | G10L 15/144 | 704/256.8 |
| 2006/0143017 A1 * | 6/2006 | Sonoura | G10L 15/26 | 704/275 |
| 2006/0257830 A1 * | 11/2006 | Lin | G09B 5/04 | 434/167 |
| 2006/0287850 A1 * | 12/2006 | Morikawa | G10L 15/22 | 704/200 |
| 2007/0192910 A1 * | 8/2007 | Vu | B25J 5/007 | 700/245 |
| 2008/0256008 A1 * | 10/2008 | Kwok | G06N 3/004 | 706/20 |
| 2008/0281766 A1 * | 11/2008 | Kwok | G06N 3/004 | 706/12 |
| 2009/0030552 A1 * | 1/2009 | Nakadai | G06N 3/008 | 700/258 |
| 2009/0099849 A1 * | 4/2009 | Iwasawa | G10L 15/22 | 704/275 |
| 2009/0162824 A1 * | 6/2009 | Heck | G06N 3/004 | 434/322 |
| 2009/0187278 A1 * | 7/2009 | Zhuk | G05D 1/0088 | 700/246 |
| 2009/0210227 A1 * | 8/2009 | Sugiyama | G10L 15/22 | 704/246 |
| 2009/0252423 A1 * | 10/2009 | Zhu | G06K 9/00201 | 382/209 |
| 2009/0313019 A1 * | 12/2009 | Kato | G10L 17/26 | 704/254 |
| 2009/0319267 A1 * | 12/2009 | Kurki-Suonio | G10L 15/30 | 704/235 |
| 2010/0185328 A1 * | 7/2010 | Kim | B25J 9/104 | 700/259 |
| 2010/0250241 A1 * | 9/2010 | Iwahashi | G10L 15/1822 | 704/10 |
| 2010/0329479 A1 * | 12/2010 | Nakadai | B25J 9/00 | 381/92 |

(56) References Cited

U.S. PATENT DOCUMENTS

| | | | | |
|---|---|---|---|---|
| 2011/0224978 A1* | 9/2011 | Sawada | ............. | G06K 9/00221 |
| | | | | 704/231 |
| 2011/0231016 A1* | 9/2011 | Goulding | ............... | G06N 3/008 |
| | | | | 700/246 |
| 2013/0103196 A1* | 4/2013 | Monceaux | ............. | A63F 9/183 |
| | | | | 700/253 |

FOREIGN PATENT DOCUMENTS

| WO | 2012/000927 A1 | 1/2012 |
|---|---|---|
| WO | 2012/010451 A1 | 1/2012 |
| WO | 2013/150076 A1 | 10/2013 |

OTHER PUBLICATIONS

M. Fumagalli, "Increasing Perceptual Skills of Robots Through Proximal Force/Torque Sensors, Chapter 1: The Role of Force Perception and Backdrivability in Robot Interaction," 2014.

H. Mobahi et al., "Concept Oriented Imitation: Towards Verbal Human-Robot Interaction," Proceedings of the 2005 IEEE International Conference on Robotics and Automation, Apr. 2005, pp. 1495-1500.

H. Markert et al., "An Approach to Language Understanding and Contextual Disambiguation in Human-Robot Interaction," Aug. 29, 2006.

Hartwig Holzapfel et al., "Implementation and evaluation of a constraint-based multimodal fusion system for speech and 3D pointing gestures," Proceedings of the 6th International Conference on Multimodal Interfaces, Jan. 1, 2004, pp. 175-181, XP055150265.

R. Stiefelhagen et al., "Enabling Multimodal Human-Robot Interaction for the Karlsruhe Humanoid Robot," IEEE Transactions on Robotics, vol. 23, No. 5, Oct. 1, 2007, pp. 840-851, XP011193531.

Stiefelhagen et al., "Enabling Multimodal Human-Robot Interaction for the Karlsruhe Humanoid Robot", IEEE Transactions on Robotics, vol. 23. No. 5, pp. 840-851, (Oct. 2007).

* cited by examiner

METHOD OF PERFORMING MULTI-MODAL DIALOGUE BETWEEN A HUMANOID ROBOT AND USER, COMPUTER PROGRAM PRODUCT AND HUMANOID ROBOT FOR IMPLEMENTING SAID METHOD

CROSS-REFERENCE TO RELATED APPLICATIONS

This application is a National Stage of International patent application PCT/EP2015/058373, filed on Apr. 17, 2015, which claims priority to foreign European patent application No. EP 14305583.8, filed on Apr. 17, 2014, the disclosures of which are incorporated by reference in their entirety.

FIELD OF THE INVENTION

The invention relates to a method of performing a so-called "multimodal" dialogue between a humanoid robot and a user, or interlocutor, which is usually human. The invention also relates to a computer program product and a humanoid robot for the implementation of such a method.

BACKGROUND

A "humanoid robot" can be defined as a robot with certain attributes of the appearance and functionality of a human being such as a trunk, head, arms, legs, the ability to communicate orally with a human being using voice-recognition and vocal synthesis, etc. A robot of this kind aims at reducing the cognitive distance between man and machine. One of the most important characteristics of a humanoid robot is its ability to support a dialogue as natural as possible with a human interlocutor. This capability is essential for the development of "companion robots" to help the elderly, sick or simply lone people in the necessities of daily life, and to provide these people with an acceptable—also from the emotional point of view—substitute to the presence of a human personal assistant. For this, it is essential to develop the ability of such humanoid robots to interact with humans in a way which emulates as closely as possible human behavior. In particular, it is necessary that the robot can interpret questions or statements of the human being, make replicas in conversational mode, with a wealth of expression corresponding to that of a human being and modes of expression that are in synergy with the types of behaviors and emotions that are typically those of a human being.

A first step in this direction has been made thanks to the methods of programming Nao™ humanoid robots marketed by the applicant and disclosed in international patent application WO2012/000927 concerning a robot player, and in international patent application WO2012/010451 concerning a humanoid robot with a natural interface dialogue.

However, the robots disclosed by these documents can only perform limited and predetermined elements of dialogue.

International patent application WO2013/150076 describes a humanoid robot with a conversational agent, voice recognition tools and tools for analyzing the behavior of interlocutors, which shows a richer conversational ability than that of pre-existing robots.

SUMMARY OF THE INVENTION

The invention aims at improving such a humanoid robot, making interactions with a human interlocutor richer and more realistic. The invention includes, in particular, the project called "Juliette", which aims at improving human-robot interaction by providing the robot with the ability to interpret the actions of the user.

An object of the invention, allowing achieving such a goal, is a method of performing a dialogue between a humanoid robot and at least one user according to claim 1, comprising the following steps, carried out iteratively by said humanoid robot:

i) acquiring a plurality of input signals from respective sensors, at least one said sensor being a sound sensor and at least one other sensor being a motion or image sensor;

ii) interpreting the acquired signals to recognize a plurality of events generated by said user, selected from a group comprising: the utterance of at least a word or sentence, an intonation of voice, a gesture, a body posture, a facial expression;

iii) determining a response of said humanoid robot, comprising at least one event selected from a group comprising: the utterance of at least a word or sentence, an intonation of voice, a gesture, a body posture, a facial expression, said determining being performed by applying a set of rules, each said rule associating a set of input events to a response of the robot;

iv) generating, by said humanoid robot, said or each said event; characterized in that at least some of said rules applied at said step iii) associate a response to a combination of at least two events jointly generated by said user and recognized at said step ii), of which at least one is not a word or sentence uttered by said user.

Particular embodiments of such a method constitute the subject-matter of the dependent claims.

Another object of the invention is a computer program product comprising program code instructions for executing such a method when said program is executed by at least one processor embedded on a humanoid robot, said robot comprising: a plurality of sensors operatively connected to said or at least one processor and comprising at least one sound sensor and at least one image or movement sensor, to acquire respective input signals; a speech synthesis module controlled by said or at least one said processor to utter words or sentence; and a set of actuators driven by said or at least one said processor enabling said robot to perform a plurality of movements or gestures.

Yet another object of the invention is a humanoid robot comprising:

at least one embedded processor;

a sensor assembly operatively connected to said or at least one said processor and comprising at least one sound sensor and at least one image or movement sensor, to acquire respective input signals;

a speech synthesis module driven by said or at least one said processor to utter words or sentences, and a set of actuators driven by said or at least one said processor enabling said robot to perform a plurality of movements or gestures; characterized in that said or at least one said processor is programmed or configured to carry out a method according to an embodiment of the invention.

Such a humanoid robot may further comprise a device for connection to at least one remote server, said or at least one said processor being programmed or configured to cooperate with said or at least one said remote server to carry out a method according to an embodiment of the invention.

BRIEF DESCRIPTION OF THE DRAWINGS

Other features, details and advantages of the invention will become apparent upon reading the following description made with reference to the accompanying drawings given by way of example, wherein.

DETAILED DESCRIPTION

Figure 1:
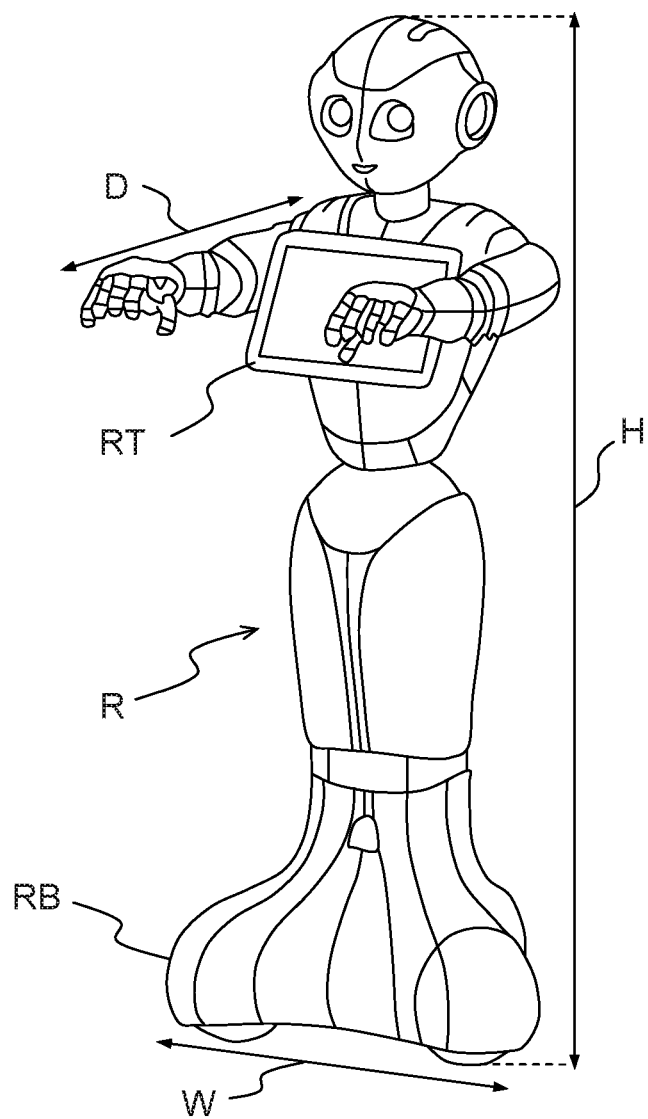
FIG. 1 shows a physical architecture of a humanoid robot suitable for implementing the invention.

FIG. 1 displays a physical architecture of a humanoid robot in a number of embodiments of the invention.

The specific robot R on the figure is taken as an example only of a humanoid robot in which the invention can be implemented. The lower limb of the robot on the figure is not functional for walking, but can move in any direction on its base RB which rolls on the surface on which it lays. The invention can be easily implemented in a robot which is fit for walking. By way of example, this robot has a height H which can be around 120 cm, a depth D around 65 cm and a width W around 40 cm. In a specific embodiment, the robot of the invention has a tablet RT with which it can communicate messages (audio, video, web pages) to its environment, or receive entries from users through the tactile interface of the tablet. In addition to the processor of the tablet, the robot of the invention also uses the processor of its own motherboard, which can for example be an ATOM™ Z530 from Intel™. The robot of the invention also advantageously includes a processor which is dedicated to the handling of the data flows between the motherboard and, notably, the boards bearing the Magnetic Rotary Encoders (MREs) and sensors which control the motors of the joints in a limb and the balls that the robot uses as wheels, in a specific embodiment of the invention. The motors can be of different types, depending on the magnitude of the maximum torque which is needed for a definite joint. For instance, brush DC coreless motors from E-Minebea™ (SE24P2CTCA for instance) can be used, or brushless DC motors from Maxon™ (EC45_70W for instance). The MREs are preferably of a type using the Hall effect, with 12 or 14 bits precision.

In embodiments of the invention, the robot displayed on FIG. 1 also comprises various kinds of sensors. Some of them are used to control the position and movements of the robot. This is the case, for instance, of an inertial unit, located in the torso of the robot, comprising a 3-axes gyrometer and a 3-axes accelerometer. The robot can also include two 2D color RGB cameras on the forehead of the robot (top and bottom) of the System On Chip (SOC) type, such as those from Shenzen V-Vision Technology Ltd™ (OV5640), with a 5 megapixels resolution at 5 frames per second and a field of view (FOV) of about 57° horizontal and 44° vertical. One 3D sensor can also be included behind the eyes of the robot, such as an ASUS XTION™ SOC sensor with a resolution of 0.3 megapixels at 20 frames per second, with about the same FOV as the 2D cameras. The robot of the invention can also be equipped with laser lines generators, for instance three in the head and three in the base, so as to be able to sense its relative position to objects/beings in its environment. The robot of the invention can also include microphones to be capable of sensing sounds in its environment. In an embodiment, four microphones with a sensitivity of 300 mV/Pa+/−3 dB at 1 kHz and a frequency range of 300 Hz to 12 kHz (−10 dB relative to 1 kHz) can be implanted on the head of the robot. The robot of the invention can also include two sonar sensors, possibly located at the front and the back of its base, to measure the distance to objects/human beings in its environment. The robot can also include tactile sensors, on its head and on its hands, to allow interaction with human beings. It can also include bumpers on its base to sense obstacles it encounters on its route.

To translate its emotions and communicate with human beings in its environment, the robot of the invention can also include:

LEDs, for instance in its eyes, ears and on its shoulders;
Loudspeakers, for instance two, located in its ears.

The robot of the invention may communicate with a base station or other robots through an Ethernet RJ45 or a WiFi 802.11 connection.

The robot of the invention can be powered by a Lithium Iron Phosphate battery with energy of about 400 Wh. The robot can access a charging station fit for the type of battery that it includes.

Position/movements of the robots are controlled by its motors, using algorithms which activate the chains defined by each limb and effectors defined at the end of each limb, in view of the measurements of the sensors.

Figure 2:
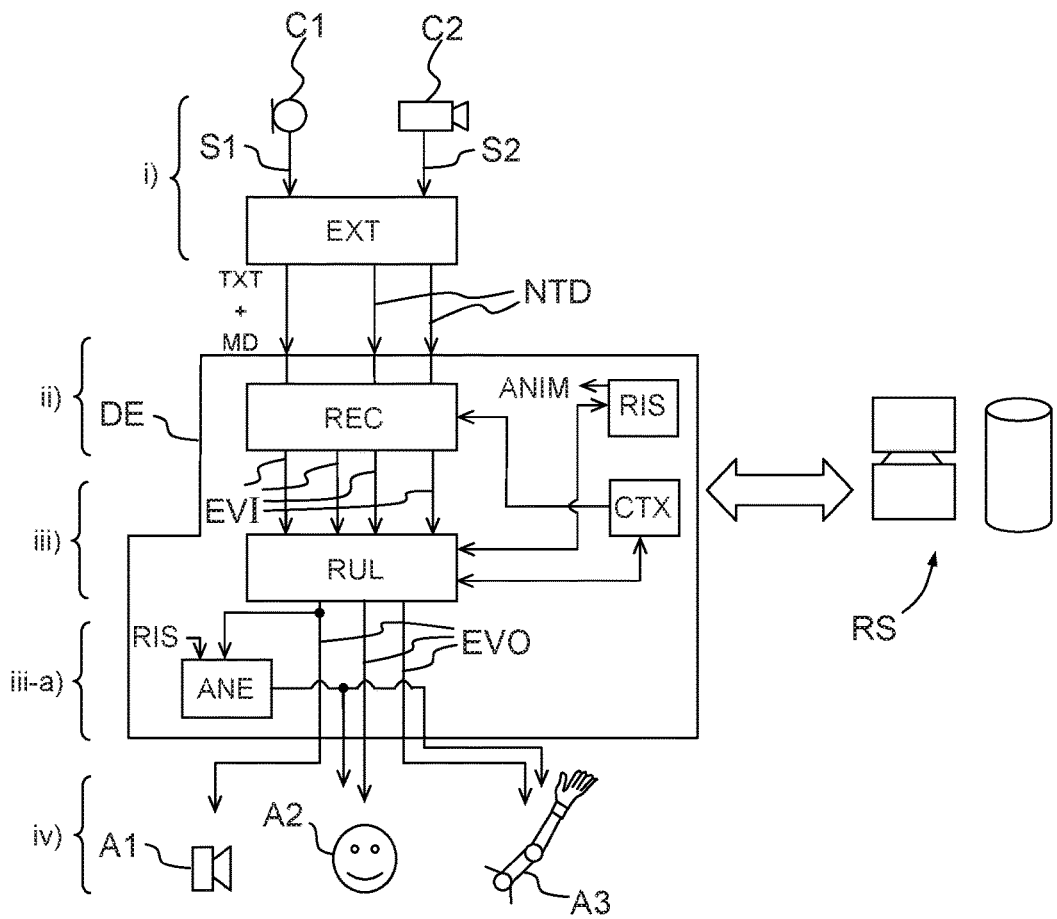
FIG. 2 is a diagram illustrating the steps of a method according to an embodiment of the invention and an arrangement of hardware and software means for its implementation.

FIG. 2 illustrates a method of dialogue according to one embodiment of the invention. Dialogue obtained by the implementation of such a method can be called "multimodal" because the robot takes into account, for formulating its response, a combination of qualitatively different events, such as spoken words, gestures, body attitudes, facial expressions, etc. generated by a user (or interlocutor). It should be noted that the aforementioned international application WO2013/150076 also discloses a method wherein the robot reacts to a gesture—e.g. a waving of the hand—of the interlocutor, but not to a specific combination of jointly-generated verbal and non-verbal events.

In a first step i) of the method illustrated on FIG. 2, input signals s1, s2 from respective sensors c1 (a microphone) and c2 (a camera) are acquired by the robot and processed by bank of extractor modules EXT (here and below, the term "module" is used to indicate a software module run by an embedded processor or by a remote sensor; it should be understood that hardware, or hardware-software hybrid implementations, are always possible and fall within the scope of the invention). Each extractor module receives an input signal, or a plurality of signals of a given type, and outputs information for use by other modules of the robot. For example, in the case of FIG. 2, a first extractor module processes the signals s1 from microphone c1 to provide a textual output TXT obtained by transliterating sounds identified as compatible with a human voice, and metadata MD representative of an intonation of said voice (happy, sad, angry, imperative, interrogative . . . ); a second and a third extraction module treat signals s2 from camera c2 to generate "non-textual data" NTD representative of points of interest, respectively, of a face and of an arm of a user in the field of view of said camera. The output of the bank of extractors modules are provided as inputs to a dialogue engine module, DE. The processing performed by this module can be complex and require access to databases of significant size. For this reason, this processing may be partially performed by one or more remote servers RS, accessed through an Internet connection.

The dialogue engine module comprises a recognition module REC which receives as inputs the data TXT, MD, NTD and associates them to predefined "input events" EVI. For example, the module REC may associate textual data TXT to words of a dictionary; also, it may associate a particular configuration of points of interest of a user's face to a smile, and even attribute a numerical value to said smile (e.g. a value comprised between 0 and 5, wherein 0 means no smile and 5 very large smile); also, it may associate a particular configuration of points of interest of a user's arm to a gesture, e.g. a waving. Depending on the specific embodiment considered, the tasks of the recognition module can be carried out by the extractor modules—e.g. one may have a "smile extractor", providing directly a smile value as described above.

A "dialogue context" or "topic", parameter CTX, stored in a memory of the robot, may influence the decisions of the recognition module. Indeed, similar entries can be interpreted as different events depending on the context; for example, in different contexts a wide opening of the user's mouth can be interpreted as a yawning or an expression of stupor. This corresponds to a second step ii) of the inventive method.

A third step iii) of the inventive method is carried out by a "rule application" module RUL which associates a response to an input event, or a combination of input events. The response is constituted by one or more "output events" EVO, which can be words or phrases to be uttered by the robot, sounds to be emitted by it, gestures to be performed by it, expressions of its "face" etc. The above-cited international application WO2012/010451 describes a rule application module which can be used in the present invention, albeit with an important modification. Indeed, according to the present invention, at least some of the rules associate a response not to a single input event, but to a combination of at least two jointly-generated events, of which at least one is non-verbal (i.e. does not consist in the utterance of a word or sentence by the user). According to a preferred embodiment of the invention, at least some of the rules—and particularly some of those taking multiple events as their inputs—determine responses consisting of a combination of output events, of which at least one is non-verbal.

For example, a possible rule may be:

IF {(smile>2) AND [waving or "hallo" or "hi"]} THEN {(smile=4) AND waving AND "hallo"}.

This means that if the user smiles with an at least moderate smile and waves his hand or say "hallo" or "hi", then the robot replies with a large smile, a waving and the utterance of the word "hello".

By "jointly generated" events it is meant two or more events which are sufficiently near in time to be considered simultaneous for the purpose of the dialogue. For example, if a user waves his hand and then, one second later, says "hallo", the two events are considered to be jointly generated, even if they are not strictly speaking simultaneous.

At each time, applicable rules depend on a dialogue context CTX, which in turn is determined by previously applied rules and/or inputs. Rules relating to a same context or topic form a "dialogue", which can be edited by a programmer as disclosed by international application WO 2011/003628. Examples of dialogue topics might be "football", "politics", "cooking", but also "meeting" when the user initiates the dialogue with the robot (or vice-versa, as it will be explained later) or "bye" when the user leaves or expresses the will of terminating the dialogue.

Moreover, at each time, applicable rules may depend on an internal state RIS of the robot, which in turn is determined by previously applied rules and/or inputs. Examples of internal states are "happy", "sad", "tired", but also "battery discharged" or "mechanical failure".

For example, if the robot recognizes that the user has a sad expression, its internal state will become "concerned". If then the user says "I am not very well today", the dialogue context will take the value "health" (indicating that health will be the topic of the conversation), determining a set of appropriate rules.

It is to be understood that the "generation" of an input event does not necessarily requires an action performed by the user; for example, the fact that the user wears colorful cloths may be an "event". Rules of a particular class, called "proactive rules", are applied to determine a response to an event—or combination of events—not including words uttered by the user or identified gestures. In other term, the robot reacts to stimuli such as the number of people present in a room, the expression of a silent user, the color of a cloth, etc. by initiating the dialogue. In a particular embodiment of the invention, some "small talk" topics are labeled as being proactive, which means that all the rules relating to said topics are proactive. An example of "small talk" topic is "smile", containing rules which are applied when the user smiles without speaking. More specific topics such as "cooking" or "politics" are usually not proactive.

Figure 3:
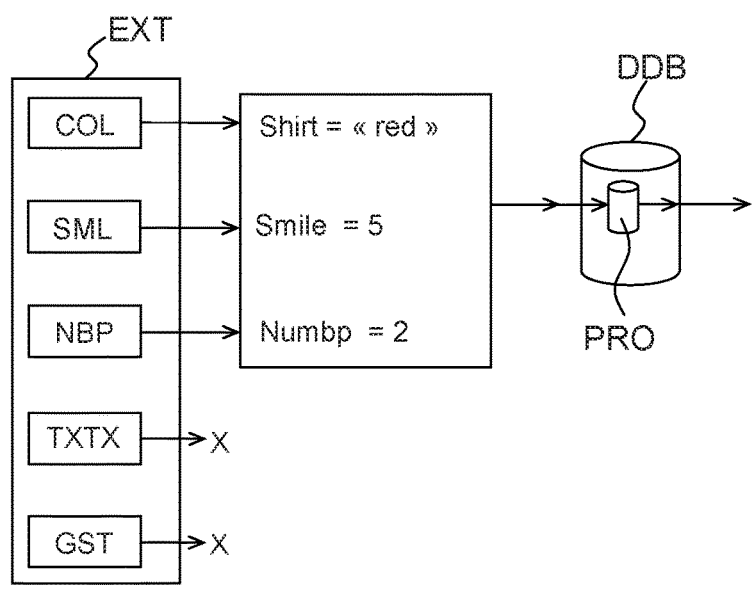
FIG. 3 is a diagram illustrating the implementation of a "proactive" dialogue according to one embodiment of the invention.

FIG. 3 illustrates the implementation of a "proactive" dialogue according to a particular embodiment of the invention. The extractor bank EXT comprises a color extractor COL, recognizing the color of different elements of a scene, a smile extractor SML, an extractor module NBP determining the number of people in a room, a text extractor TXTX and a gesture extractor GST. In a specific situation, the color extractor identifies a red shirt, the smile extractor recognizes a very large smile (smile=5) of the user and the NBP module counts 2 people in the room, while the modules TXTX and GST indicate that the user is neither speaking nor performing a well-identified gesture. The dialogue engine, and more precisely the rule application module RUL, will then search a "proactive" rule applicable to this situation within a subset PRO, containing "small talk" topics, of a dialogue database DDB.

The method of FIG. 2 also comprises an optional step iii-a) of animating a response of the robot, when the latter consists of—or comprises—the utterance of at least a word or sentence. An animation is a sequence of movements of the robot and/or other non-verbal events (e.g. changes of expression) which accompanies its speech, emulating the "body talk" of a human being. An animated response might be indistinguishable from a multimodal response including speech and movements; however, they are produced in different ways. A multimodal response is directly determined by a rule application module, as discussed above; instead, an animation is added to a verbal response by a dedicated module ANE, taking output specific events EVO (namely, verbal events, i.e. words to be uttered) generated by the rule application module as its inputs, as it will be explained below with reference to FIGS. 4, 5a, 5b and 5c.

Figure 4:
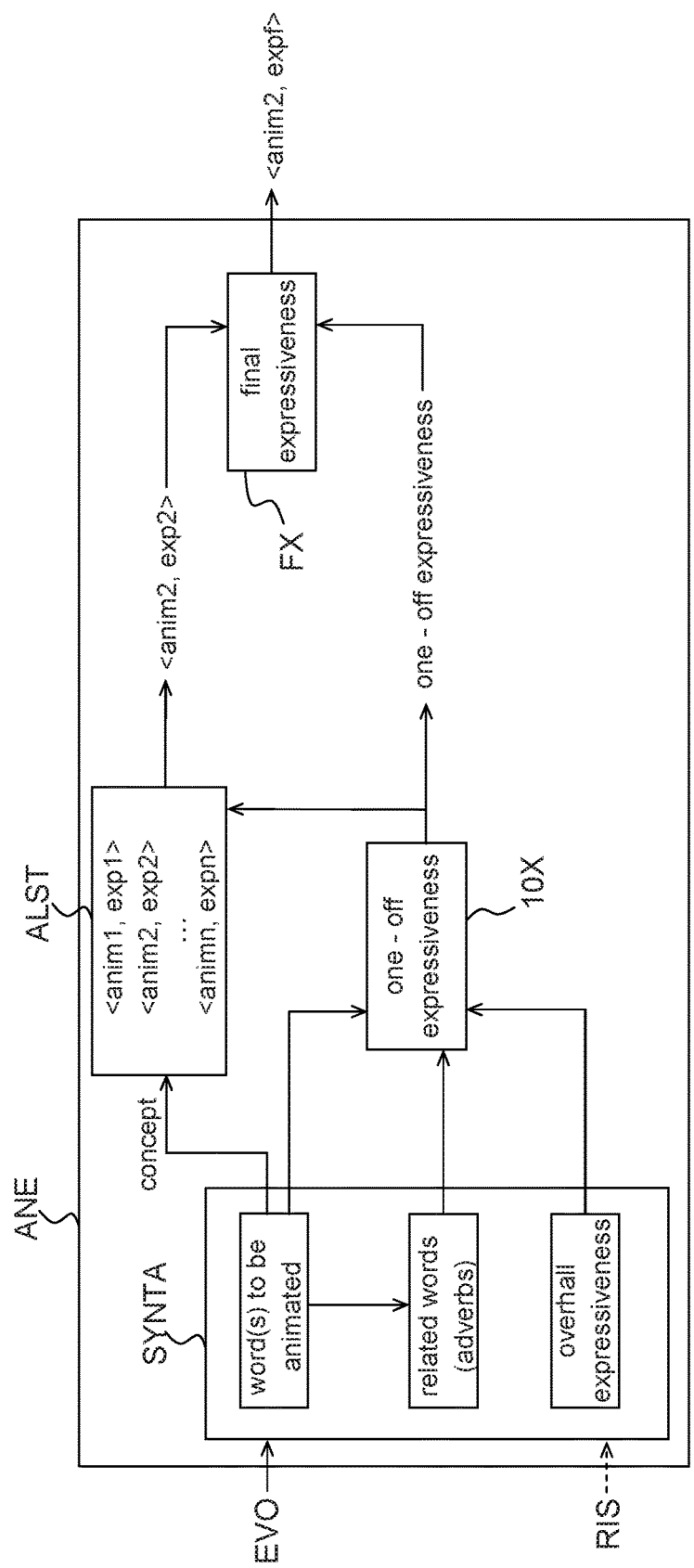
FIG. 4 is a diagram illustrating a step of animating a response of a humanoid robot according to an embodiment of the invention.

As illustrated on FIG. 4, the animation module, or engine, ANE comprises a syntax analysis module SYNTA, an animation list AST stored in a memory embarked on, or accessible by, the robot, and two modules 1OX and FX for computing expressiveness values. An "expressiveness value" is a parameter determining to which extent a movement has to be "theatrical" or "discrete". An "expressiveness coefficient" defines a modification of an expressiveness value. The term "expressiveness" refers to both expressiveness values and coefficients.

Syntax analysis allows, as it will be discussed later with reference to FIGS. 5a, 5b and 5c, to determine the word(s) to be animated and related words which are not animated by themselves but influence the expressiveness of the animated word(s). Moreover, the syntax analysis module may also determine an "overall" expressiveness of the text to be uttered e.g. by taking into account the frequency of "emotional words" in the text and/or the internal state RIS of the robot. Each word to be animated has an expressiveness on its own; this expressiveness is combined with those of the related word and to the overall expressiveness of the text by module 1OX, which outputs an expressiveness value called "one-off expressiveness".

Each word to be animated is also associated to a "concept". The concept and the one-off expressiveness are used to choose an animation within an animation list ALST. The choice depends on the concept associated to the word and on the one-off expressiveness computed by module 1OX. For example, each animation of the list may be associated to one or more concepts, and have a specific expressiveness value; in this case, the animation associated to the concept expressed by the word to be animated, and whose specific expressiveness value is closest to the one-off expressiveness is selected. In the example of FIG. 4, the selected animation is called anim2 and has a specific expressiveness of exp2. Finally, a module FX combines (e.g. averages) the specific expressiveness of the selected animation and the one-off expressiveness to compute a final expressiveness expf. The output of the animation engine is a pair (animation, final expressiveness). The final expressiveness value determines e.g. the speed and/or amplitude of the gestures composing the animation.

Figure 5A:
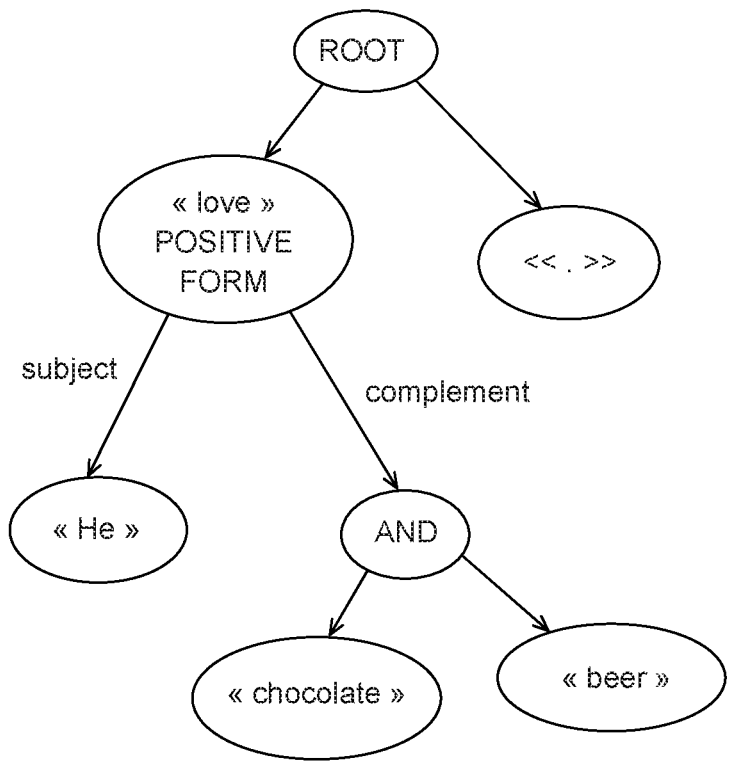
FIGS. 5a, 5b and 5c are three examples of syntactic analysis of sentences for the determination of one or more words to be animated.

FIG. 5a illustrates the syntactical analysis of a sentence to be animated: "He loves chocolate and beer". The syntactical tree puts in evidence the conjunction "AND" linking two complements, which indicates an enumeration. In this case, the conjunction is the word to be animated. It is associated with a concept "enumeration", which in turn is associated with an enumeration called "two", consisting in a gesture wherein the robot closes his hand, it extends its thumb and then it extends its index.

Figure 5B:
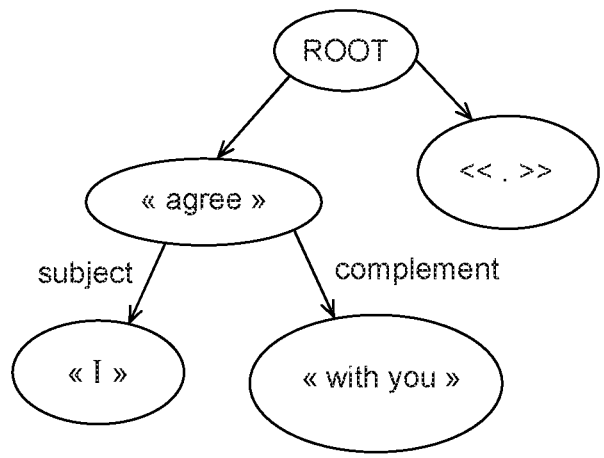
Figure 5C:
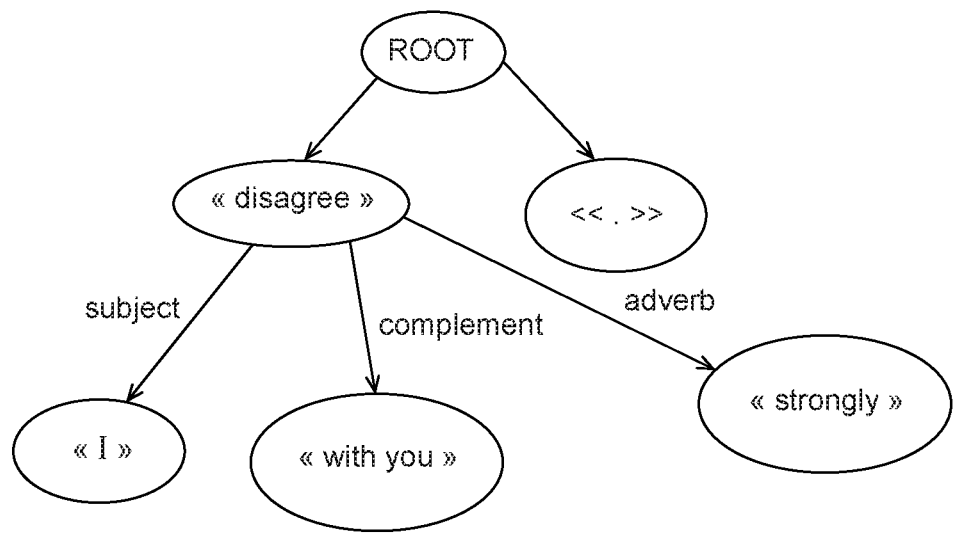

FIG. 5b illustrates the syntactical analysis of another sentence to be animated: "I agree with you". This is a simple sentence with a verb in positive form, a subject and a complement. All the words, except "with" are animated: "I", by an animation "myself" wherein the robot indicates itself, "agree" with an animation "yeah" wherein the robot nods; and you by a robot.

These two examples are very simple ones, wherein expressiveness does not play any role. A more complex example is constituted by the sentence "I strongly disagree with you", whose syntactical tree is illustrated on FIG. 5c. In this case, the verb is in negative form (semantically, if not grammatically); in such a case, the verb itself is animated, but not the subject and the complement. Moreover, there is an adverb ("strongly") which emphasizes the disagreement.

The verb "disagree" is associated with the concept "disagreement" and has an expressiveness value of 5 on a scale from 0 to 10. The one-off expressiveness, however, increases from 5 to 8 due to the presence of the adverb "strongly". In an embodiment of the invention, the internal state RIS of the robot could also alter the one-off expressiveness value.

There are three animations associated to the concept "disagreement": "oppose1" with a specific expressiveness of 3, which only comprise a change of expression of the robot; "oppose2" and "oppose3" with specific expressivenesses of 6 and 9 respectively, which also include gestures. The animation whose specific expressiveness is closes to the one-of expressiveness is "oppose3", which is then selected. However, its final expressiveness is reduced to 8.5, corresponding to the average of the specific and the one-off expressivenesses. This means that the gestures will be slightly slower and/or less ample than in the "standard" version of "oppose3".

Reverting back to FIG. 2, it can be seen that output events and/or animation are used to drive different actuators of the robot to "perform" the response. In the exemplary embodiment of the figure, the actuators are a loud-speaker A1, a set of facial expression-controlling actuators A2 and limb-controlling actuators A3. This is step iv) of the method of FIG. 2.

Even an animated and/or multimodal dialog with a humanoid robot may be perceived as awkward and unnatural if the robot stands by the user and stares directly at him or her. Moreover, if the robot is too close to the user, it may punch him or her while "speaking with its hands" in order to produce an animated or multimodal response. There is also a general risk of the robot falling upon the user in case of dysfunction. For this reason, according to a preferred embodiment of the invention, the robot is servo-controlled to maintain a distance from the user within a predetermined (and possibly context-dependent) range. Advantageously, the distance is measured between a part of the robot, e.g. its waist, and the lower body (up to the waist) of the user: this allows the user to lean toward the robot and touch it with his/her hand without causing it to move back. Advantageously, the robot is also servo-controlled to maintain an orientation with respect to the user within a predetermined (and possibly context-dependent) angular range. Preferably, the robot performs pseudo-random translation and/or rotation movements while remaining within said distance and angular ranges, to avoid the disturbing feeling induced by an unnaturally static robot.

Figure 6:
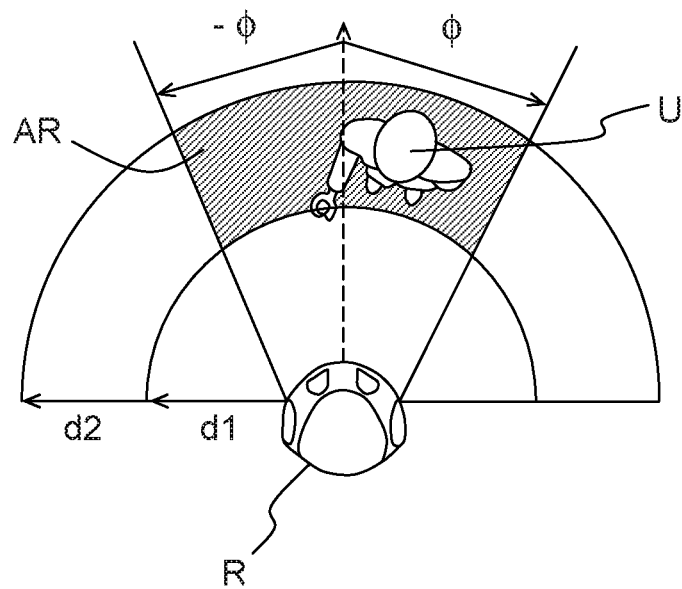
FIG. 6 illustrates the servo-control of the position of the robot relative to a user according to an embodiment of the invention.

FIG. 6 shows the robot R and a user U from above. In a reference frame centered on the robot, it is required that the user—or, more precisely, the user's lower body—remains in an authorized region AR defined by a distance range [d1, d2] and an angular range [−Φ, Φ]. If the user moves, the robot also moves to keep this condition satisfied. Moreover, as mentioned above, the robot may perform pseudo-random translation and/or rotation movements while maintaining the user in the authorized region.

In order to obtain a "natural" behavior of the robot, the distance and angular ranges may vary during the dialog, depending on the active topic.

The position of the user with respect to the robot may be determined by using cameras coupled with image processing modules, laser line generators and/or sonar sensors: see above, the description of the physical architecture of a humanoid robot accompanying FIG. 1.

Reverting back to FIG. 2, it will be noted that step ii) of interpreting input signals to recognize different kinds of events, either verbal or non-verbal, is a very important step of a method according to the invention. Recognizing events means matching input signals to an item of a predetermined list of expected events stored in a memory of the humanoid robot, or accessible by it. Advantageously, said list of expected events is selected, among a plurality of said lists, depending on the dialogue context or topic.

For example, speech recognition consists in matching sound signals acquired by sensors with a natural language word, or series of words, of a dictionary, which can be context-specific. Usually, each matching result is associated to a confidence score; the higher this score, the greater the probability of correctness of the matching. Usually, a threshold is used to discriminate between "successful" matching and failed attempts to identify an event.

Depending on the particular kind of event to be recognized, several matching methods, of different complexity, are known in the art. For example, in the field of speech recognition the following methods (or, rather, families of methods) are known:

Exact matching: this is the simplest, and fastest, method, using a finite state machine to check if an input contains, exactly, a word or sentence. The confidence score is Boolean: either the matching is certain (score=1), or the identification attempt has filed (score=0).

Approximate matching: it is also based on a finite state machine, but it allows certain mistakes in the matching chain. The confidence score decreases as the number of mistakes increases.

Phonetic matching (for speech recognition only), based on the determination of a phonetic distance between the input and the words, or sentences, of the dictionary.

Semantic matching, the most complex method is based on a computation of the distance between the observed vocabulary in the input and the vocabulary in each dialogue entry. The distance is the cosine measure between the vector representation of said input and said entries. The vectors are calculated following a "bag-of-word" distributional semantic representation, using TF-IDF (Term Frequency—Inverse Document Frequency), weighting.

Rather than using a single matching method, the robot may use a hierarchical approach, starting from the simplest method, accepting the result if the confidence score exceeds a preset threshold and trying with a more complex method otherwise; if the confidence score obtained using the most complex matching method (e.g. semantic) is still below the threshold, then the search has failed. In this case, the robot either ignores the input or asks for clarification (e.g. by uttering "Sorry, what did you say?", in case of failed speech recognition).

The hierarchy can also be adapted to factors such as the speech recognition technology used. Semantic matching will be preferred when the ASR (Automatic Speech Recognition) is based on large language models, while phonetic matching will help recover errors from less robust embedded ASR results.

Advantageously, the robot may select a subset of matching methods depending on different parameters, and in particular on the dialogue context or topic. If the ongoing dialogue is a "closed" one, wherein only a few different inputs are expected, exact matching is likely to work successfully, and is then worth trying. On the contrary, in the case of a very broad context, allowing a large number of possibly input events, it might be preferable to drop exact and approximate marching and to start directly with phonetic or even semantic methods. On the right part of FIG. 7 it is illustrated a hierarchical chain of matching methods MM1-MM4 of increasing computational complexity. For each matching method, two outcomes are possible: either the matching is successful, in which case an input event EVI is generated, or it is not, in which case the next matching method is tried (except for MM4). The first matching method to be tried is not necessarily MM1: it is selected by a matching strategy engine MSE depending on the dialogue context CTX and possibly other parameters.

If an internet connection is available, at least the most complex matching method(s) may be carried out by a remote server (see FIG. 2).

Figure 7:
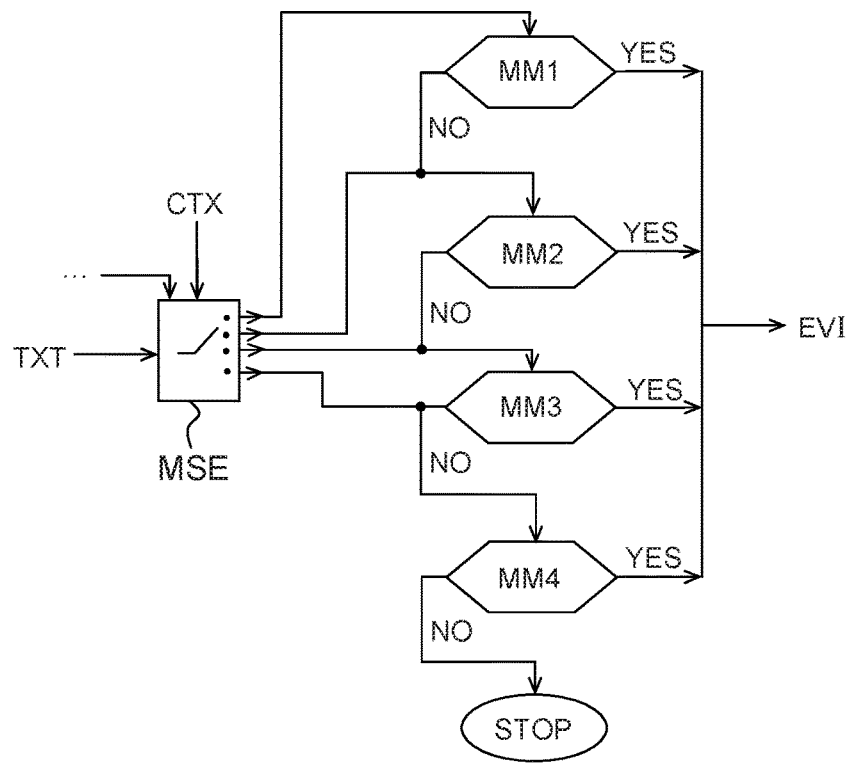
FIG. 7 is a diagram illustrating a step of identifying events according to one embodiment of the invention.

FIG. 7 refers to the case of speech recognition, taking as input signal a text TXT obtained by transliterating a sound recognized as a human voice by a suitable extractor, but this approach is more general. It will be understood that it is not limited to the case of "multimodal" dialogue.

Figure 8:
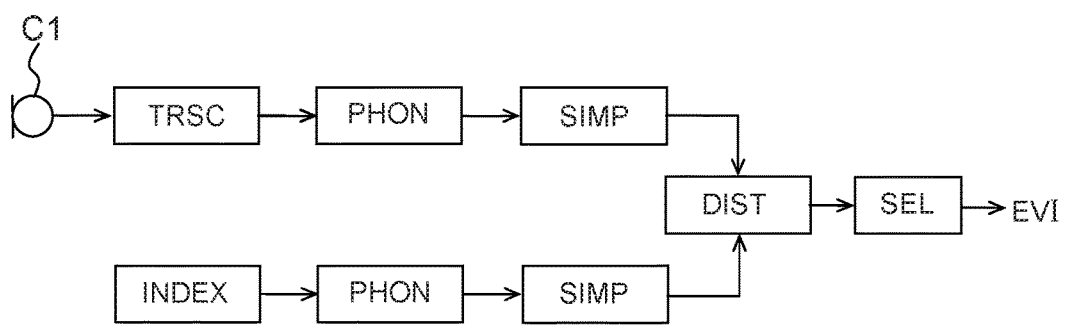
FIG. 8 is a diagram illustrating a step of phonetic speech recognition according to one embodiment of the invention.

A particular speech-recognition method, based on phonetic matching, will now be described with reference to FIG. 8.

Sounds acquired by a sensor (microphone) c1 are provided as inputs to a transcription module TRSC, which converts them into a text. Then, this text is converted into its phonetic equivalent, by taking into account the specificity of the language of the dialogue (which is a parameter determined by the robot e.g. depending on the identity of the user, recognized with the help of a camera and a face recognition module, known in the art), by a phonetic conversion module PHON. Transcription and phonetic conversion could also be performed jointly; together, they constitute what can be called a "phonetic transcription".

Then, the phonetic transcription is simplified and smoothed by a simplifying module SIMP.

"Simplifying" consists in representing by a single phoneme different phonemes which are likely to be confused with each other—e.g. "d" and "t' or "k" and "g".

"Smoothing" consists in ignoring the statement segmentation proposed by the transcription module (which lies often at the origin of recognition errors), while retaining the information that has motivated it. To this extent, vowels are ignored, except those at the beginning of each word (as identified by the transcription module) and nasal ones. The expected words contained in an INDEX are subject (advantageously offline) to the same or a similar processing. A distance computing module DIST determines the edit distance between the simplified and smoothed phonetic transcription of the input sound and the simplified as smoothed entries of the index. Then, a selection module SEL selects the entry corresponding to the smallest edit distance.

By way of example if the user says, in French "A demain" (i.e. "See you tomorrow"), the phonetic transcription will be "A DOE MIN" which is then simplified as "ATMN" ("N" representing a nasal vowel).

Edit distance is defined as the minimal number of changes which are necessary to convert a string of letters to another one. For example, the edit distance between ADMN et BDLNS is 3 because three changes are necessary:

ADMN→BDMN ("A" is changed to "B");
BDMN→BDLN ("M" is changed to "L")
BDLN→BDLNS (addition of "S").

The invention has been described by considering specific embodiments which combine multi-modal dialogue, animated speech, servo-control of the robot position and particular methods of event (and more particularly speech) recognition. Although they work best in synergy, these different aspects of the invention can also be implemented independently from each other.

The invention claimed is:

1. A method of performing a dialogue between a humanoid robot and at least one user comprising the following steps, carried out iteratively by said humanoid robot:
   i) acquiring a plurality of input signals from respective sensors, at least one said sensor being a sound sensor and at least one other sensor being a motion or image sensor;
   ii) interpreting the acquired signals to recognize a plurality of events generated by said user, selected from a group comprising: the utterance of at least a word or sentence, an intonation of voice, a gesture, a body posture, a facial expression;
   iii) determining a response of said humanoid robot, comprising at least one event selected from a group comprising: the utterance of at least a word or sentence, an intonation of voice, a gesture, a body posture, a facial expression, said determining being performed by applying a set of rules, each said rule associating a set of input events to a response of the robot;
   iv) generating said or each said event;
wherein at least some of said rules applied at said step iii) associate a response to a combination of at least two events jointly generated by said user and recognized at said step ii), of which at least one is not a word or sentence uttered by said user, and
   if the response determined during step iii) is or comprises at least the utterance of a word or sentence, executing a step iii-a) of performing a syntactic analysis of a sentence to be uttered by the robot to determine at least one word to be animated depending on a function of the at least one word within a structure of said sentence and determining an animation accompanying said response as a function of said analysis.

2. The method according to claim 1, wherein at least some of said rules applied at said step iii) determine a response comprising at least two events generated jointly by said humanoid robot, of which at least one is not the utterance of a word or sentence.

3. The method according to claim 1, wherein, at said step iii, said response of humanoid robot is determined based on at least one parameter selected from: a dialogue context, the identity of the user, an internal state of said humanoid robot.

4. The method according to claim 3, further comprising a step of modifying the value of said or of at least one said parameter according to said at least one event recognized at said step ii) or determined in said step iii).

5. The method according to claim 1, wherein said step ii) comprises searching a match between an acquired signal and an event belonging to a list of expected events stored in a memory of said humanoid robot, or accessible by it, said searching being carried out by successively using a plurality of matching methods with increasing complexity until an event is recognized with a confidence score greater than a predetermined value, or after the highest complexity recognition method has been used.

6. The method according to claim 5, wherein the used matching methods are selected depending on a context of dialogue.

7. The method according to claim 5, wherein said matching methods include, by order of increasing complexity: the search for an exact match, the search for an approximate match, the search for a phonetic correspondence—only in the case of voice recognition—and the search for a semantic correspondence.

8. A method of performing a dialogue between a humanoid robot and at least one user comprising the following steps, carried out iteratively by said humanoid robot:
   i) acquiring a plurality of input signals from respective sensors, at least one said sensor being a sound sensor and at least one other sensor being a motion or image sensor;
   ii) interpreting the acquired signals to recognize a plurality of events generated by said user, selected from a group comprising: the utterance of at least a word or sentence, an intonation of voice, a gesture, a body posture, a facial expression;
   iii) determining a response of said humanoid robot, comprising at least one event selected from a group comprising: the utterance of at least a word or sentence, an intonation of voice, a gesture, a body posture, a facial expression, said determining being performed by applying a set of rules, each said rule associating a set of input events to a response of the robot;
   iv) generating said or each said event;
   a step of phonetic transcription of a set of sounds acquired by a sound sensor;
   a step of simplifying and smoothing the resulting phonetic transcription;
   calculating an edit distance between said simplified and smoothed phonetic transcription and a plurality of entries, obtained by simplifying and smoothing a predefined set of words in natural language; and
   choosing a natural language word of said predefined set, corresponding to the entry with the lowest edit distance from said simplified and smoothed phonetic transcription, wherein
   at least some of said rules applied at said step iii) associate a response to a combination of at least two events jointly generated by said user and recognized at said step ii), of which at least one is not a word or sentence uttered by said user,
   said step ii) comprises searching a match between an acquired signal and an event belonging to a list of expected events stored in a memory of said humanoid robot, or accessible by it, said searching being carried out by successively using a plurality of matching methods with increasing complexity until an event is recognized with a confidence score greater than a predetermined value, or after the highest complexity recognition method has been used, and
   said matching methods include, by order of increasing complexity: the search for an exact match, the search for an approximate match, the search for a phonetic correspondence—only in the case of voice recognition—and the search for a semantic correspondence.

9. The method according to claim 8 wherein said simplifying and smoothing comprises:
   replacing phonemes prone to confusion by a single phoneme;
   removing vowels other than vowels at the beginning of words and nasal vowels, and
   removing breaks between words.

10. The method according to claim 5, wherein said list of expected events is selected, among a plurality of said lists, depending on a dialogue context.

11. The method according to claim 1 wherein said step iii) comprises determining a response to a set of events, including the absence of words uttered by said user or identified gestures, by applying rules belonging to a predefined subset, called proactive rules.

12. A method of performing a dialogue between a humanoid robot and at least one user comprising the following steps, carried out iteratively by said humanoid robot:
  i) acquiring a plurality of input signals from respective sensors, at least one said sensor being a sound sensor and at least one other sensor being a motion or image sensor;
  ii) interpreting the acquired signals to recognize a plurality of events generated by said user, selected from a group comprising: the utterance of at least a word or sentence, an intonation of voice, a gesture, a body posture, a facial expression;
  iii) determining a response of said humanoid robot, comprising at least one event selected from a group comprising: the utterance of at least a word or sentence, an intonation of voice, a gesture, a body posture, a facial expression, said determining being performed by applying a set of rules, each said rule associating a set of input events to a response of the robot;
  iv) generating said or each said event; and
  if the response determined during step iii) is or comprises at least the utterance of a word or sentence, the execution of a step iii-a) of performing linguistic analysis of the words or sentences to be uttered and determining an animation accompanying said response as a function of said analysis, said step iii-a comprises the substeps of:
    α) identifying at least one word of the response to be animated;
    β) determining a concept and expressiveness, called one-off expressiveness, associated with said or each said word to be animated; and
    γ) choosing from a list of animations stored in a memory of said humanoid robot, or accessible by it, an animation based on said concept and said one-off expressiveness, wherein
  at least some of said rules applied at said step iii) associate a response to a combination of at least two events jointly generated by said user and recognized at said step ii), of which at least one is not a word or sentence uttered by said user.

13. The method according to claim 12, wherein said substep α comprises performing a syntactic analysis of a sentence to be uttered to determine each or said word to be animated depending on its function within a structure of said sentence.

14. The method according to claim 12, wherein, in said substep β, said one-off expressiveness is determined based on at least one parameter selected from: an expressiveness of the word, an expressiveness of one or more other words related to it, and an overall expressiveness of the entire response.

15. The method according to claim 12, wherein each animation of said list is associated with one or more concepts and has a specific expressiveness, said substep γ including choosing within said list the animation associated with the concept determined in said substep β and having a specific expressiveness closest to said one-off expressiveness.

16. The method according to claim 15 further comprising the following sub step:
  δ) determining an expressiveness, called final expressiveness, based on said specific expressiveness and said one-off expressiveness.

17. The method according to claim 12, wherein either said one-off or said final expressiveness determines at least one parameter chosen among a speed and an amplitude of at least one gesture of said animation.

18. A method of performing a dialogue between a humanoid robot and at least one user comprising the following steps, carried out iteratively by said humanoid robot:
  i) acquiring a plurality of input signals from respective sensors, at least one said sensor being a sound sensor and at least one other sensor being a motion or image sensor;
  ii) interpreting the acquired signals to recognize a plurality of events generated by said user, selected from a group comprising: the utterance of at least a word or sentence, an intonation of voice, a gesture, a body posture, a facial expression;
  iii) determining a response of said humanoid robot, comprising at least one event selected from a group comprising: the utterance of at least a word or sentence, an intonation of voice, a gesture, a body posture, a facial expression, said determining being performed by applying a set of rules, each said rule associating a set of input events to a response of the robot;
  iv) generating said or each said event; and
  the following steps, implemented iteratively by said robot simultaneously with said steps i) to iv):
    A) determining the position of at least a portion of the body of said user relative to a reference frame fixed to the said robot; and
    B) driving at least one actuator of said robot to maintain the distance between said robot or an element thereof and said at least one or said body part of said user within a predefined range of values, wherein
  at least some of said rules applied at said step iii) associate a response to a combination of at least two events jointly generated by said user and recognized at said step ii), of which at least one is not a word or sentence uttered by said user.

19. The method according to claim 18 wherein said step B) further comprises driving at least one actuator of said robot to maintain an orientation of the robot with respect to said user in a predetermined angular range.

20. The method according to claim 18 wherein the steps implemented iteratively by said robot simultaneously with said steps i to iv) further comprising the step of:
  C) driving said or at least one said actuator to cause said pseudo-random displacements of the robot while maintaining said distance in said predetermined range of values and, where appropriate, said orientation in said predetermined angular range.

21. The method according to claim 18 wherein the steps implemented iteratively by said robot simultaneously with said steps i to iv) further comprising the step of:
  D) performing a semantic analysis of an ongoing dialogue between said user and said humanoid robot and, in accordance with said analysis, changing said predetermined range of distance values and, where appropriate, said predetermined angular range.

22. The method according to claim 18 wherein said step A) comprises determining the position of a lower body of said user relative to said reference frame fixed to the said robot.

23. A computer program product comprising program code instructions for executing the method according to claim 1 when said program is executed by at least one processor embedded on a humanoid robot, said robot comprising: a plurality of sensors operatively connected to said or at least one processor and comprising at least one sound sensor and at least one image or movement sensor, to acquire respective input signals; a speech synthesis module controlled by said or at least one said processor to utter words or sentence; and a set of actuators driven by said or at least one said processor enabling said robot to perform a plurality of movements or gestures.

24. A humanoid robot comprising:
   at least one embedded processor;
   a sensor assembly operatively connected to said or at least one said processor and comprising at least one sound sensor and at least one image or movement sensor, to acquire respective input signals;
   a speech synthesis module driven by said or at least one said processor to utter words or sentences, and
   a set of actuators driven by said or at least one said processor enabling said robot to perform a plurality of movements or gestures;
wherein said or at least one said processor is programmed or configured to carry out the method according to claim 1.

25. The humanoid robot comprising:
   at least one embedded processor;
   a sensor assembly operatively connected to said or at least one said processor and comprising at least one sound sensor and at least one image or movement sensor, to acquire respective input signals;
   a speech synthesis module driven by said or at least one said processor to utter words or sentences, and
   a set of actuators driven by said or at least one said processor enabling said robot to perform a plurality of movements or gestures, further comprising a device for connection to at least one remote server, said or at least one said processor being programmed or configured to cooperate with said or at least one said remote server to carry out the method according to claim 1.

* * * * *